United States Patent
Cho et al.

(10) Patent No.: US 10,896,513 B2
(45) Date of Patent: Jan. 19, 2021

(54) METHOD AND APPARATUS FOR SURVEILLANCE USING LOCATION-TRACKING IMAGING DEVICES

(71) Applicant: HANWHA TECHWIN CO., LTD., Seongnam-si (KR)

(72) Inventors: Sung Bong Cho, Changwon-si (KR); Jeong Woong Park, Changwon-si (KR)

(73) Assignee: Hanwha Techwin Co., Ltd., Seongnam-si (KR)

( * ) Notice: Subject to any disclaimer, the term of this patent is extended or adjusted under 35 U.S.C. 154(b) by 584 days.

(21) Appl. No.: 15/487,562

(22) Filed: Apr. 14, 2017

(65) Prior Publication Data

US 2017/0221219 A1 Aug. 3, 2017

Related U.S. Application Data

(63) Continuation of application No. PCT/KR2014/010107, filed on Oct. 27, 2014.

(30) Foreign Application Priority Data

Oct. 14, 2014 (KR) .......................... 10-2014-0138610

(51) Int. Cl.
*G06T 7/292* (2017.01)
*H04W 4/029* (2018.01)
*H04N 7/18* (2006.01)
*H04N 5/232* (2006.01)
*H04W 4/021* (2018.01)
*H04W 4/33* (2018.01)

(52) U.S. Cl.
CPC ......... *G06T 7/292* (2017.01); *H04N 5/23206* (2013.01); *H04N 7/18* (2013.01);
(Continued)

(58) Field of Classification Search
CPC ....... G06T 7/292; G06T 7/70; H04N 5/23206; H04N 5/23216; H04N 7/18; H04N 7/181
(Continued)

(56) References Cited

U.S. PATENT DOCUMENTS

2005/0285737 A1 12/2005 Kobayashi
2009/0268030 A1* 10/2009 Markham ................. G01S 3/54
348/158
(Continued)

FOREIGN PATENT DOCUMENTS

JP 2005338967 A 12/2005
JP 5026290 B2 9/2012
(Continued)

OTHER PUBLICATIONS

International Search Report dated Aug. 10, 2015, issued by the International Searching Authority in counterpart International Application No. PCT/KR2014/010107.

*Primary Examiner* — Sath V Perungavoor
*Assistant Examiner* — Kristin Dobbs
(74) *Attorney, Agent, or Firm* — McLean IP Global; Jason Y. Pahng

(57) ABSTRACT

Provided is a security management device for tracking a terminal located indoors. The security management device display on a map a position of the at least one wireless network camera and information about a terminal located in a range capable of wireless communication with the at least one wireless network camera, control a wireless network camera to track a position of the terminal based on the information about the terminal while the terminal is in a range capable of wireless communication with the wireless network camera, and control the wireless network camera to send identification information of the terminal to a neighboring wireless network camera when the terminal moves out of the range capable of wireless communication with the wireless network camera.

20 Claims, 8 Drawing Sheets

(52) U.S. Cl.
CPC ............ *H04N 7/181* (2013.01); *H04W 4/029* (2018.02); *G06T 2207/30196* (2013.01); *G06T 2207/30232* (2013.01); *G06T 2207/30242* (2013.01); *H04W 4/021* (2013.01); *H04W 4/33* (2018.02)

(58) Field of Classification Search
USPC ........................................................ 348/159
See application file for complete search history.

(56) References Cited

U.S. PATENT DOCUMENTS

| | | | | |
|---|---|---|---|---|
| 2014/0211019 A1* | 7/2014 | Choi | ...................... | H04N 7/181 |
| | | | | 348/159 |
| 2014/0232874 A1* | 8/2014 | Meyer | .................... | H04N 7/181 |
| | | | | 348/159 |
| 2015/0070218 A1* | 3/2015 | Manku | .................. | G01S 5/0289 |
| | | | | 342/458 |
| 2015/0381940 A1* | 12/2015 | Hari | ........................ | H04L 67/18 |
| | | | | 348/159 |

FOREIGN PATENT DOCUMENTS

| | | | |
|---|---|---|---|
| KR | 1020110057797 A | 6/2011 |
| KR | 1020120054971 A | 5/2012 |
| KR | 1020120113014 A | 10/2012 |
| KR | 1020130028317 A | 3/2013 |
| KR | 101321444 B1 | 10/2013 |
| KR | 101412811 B1 | 6/2014 |

* cited by examiner

FIG. 7

7.3.2.2.1 Example

The following example illustrates the usage of the scope value. This is just an example, and not at all an indication of what type of scope parameter to be part of a device configuration. In this example we assume that the device is configured with the following scopes:

onvif://www.onvif.org/Profile/Streaming
onvif://www.onvif.org/hardware/D1-566
onvif://www.onvif.org/location/country/china
onvif://www.onvif.org/location/city/bejing
onvif://www.onvif.org/location/building/headguarter
onvif://www.onvif.org/location/floor/R5
onvif://www.onvif.org/name/ARV-453

A client that probes for the device with scope onvif://www.onvif.org will get a match. Similarly, a probe for the device with scope.

onvif://www.onvif.org/location/country/china wil give a match. A probe with:

onvif://www.onvif.org/hardware/D1 wil not give a match.

METHOD AND APPARATUS FOR SURVEILLANCE USING LOCATION-TRACKING IMAGING DEVICES

CROSS-REFERENCE TO THE RELATED APPLICATIONS

This application is a Continuation of International Application No. PCT/KR2014/010107, and claims priority from Korean Patent Application No. 0-2014-0138610, filed on Oct. 14, 2014, in the Korean Intellectual Property Office, the disclosure of which is incorporated herein by reference in its entirety.

BACKGROUND

1. Field

Methods and apparatuses consistent with exemplary embodiments relate to a method of recognizing an indoor position and performing security management by using a wireless network camera.

2. Description of the Related Art

Position recognition technology using a global positioning system (GPS) is widely used. However, such position recognition technology tends to fail inside a building because of poor reception of. Furthermore, in analyzing a two-dimensional image based on GPS technology, counting people is difficult when a person is blocked by another person. Furthermore, a result of image analysis of a mannequin or a wall painting may have a large deviation in accuracy.

SUMMARY

Exemplary embodiments of the inventive concept provide an indoor position recognition-based security management device to address a problem that accuracy is not high in recognizing a position or tracking a position indoors.

Furthermore, exemplary embodiments of the inventive concept provide an indoor position recognition-based security management device to improve low accuracy in the analysis of images during security management such as access control through the image analysis in a security system.

According to an exemplary embodiment of the present inventive concept, there is provided a security management device including at least one processor to implement: a map display configured to store information about a position of at least one wireless network camera installed indoors and display on a map a position of the at least one wireless network camera and information about a terminal located in a range capable of wireless communication with the at least one wireless network camera; an object information recognition unit configured to receive information about a terminal from the at least one wireless network camera, the information about the terminal being collected by the at least one wireless network camera through the wireless communication; and an object position tracking unit configured to control a wireless network camera to track a position of the terminal based on the information about the terminal while the terminal is in a range capable of wireless communication with the wireless network camera, and control the wireless network camera to send identification information of the terminal to a neighboring wireless network camera when the terminal moves out of the range capable of wireless communication with the wireless network camera.

The information about the terminal includes an image captured by the at least one wireless network camera, the identification information of the terminal, and position information of the terminal.

The map display may display a position or a movement path of the terminal based on the identification information of the terminal.

The map display may simultaneously display an image captured by the at least one wireless network camera with the position of the terminal or the movement path of the terminal.

The map display may, if wireless communication between the terminal and the wireless network camera is cut off while displaying the position or the movement path of the terminal, display the wireless network camera with an image captured by the neighboring wireless network camera.

Each of the at least one wireless network camera may have an access point (AP) function and the position information of the terminal located in a range capable of wireless communication is collected by using the AP function.

The map display may display a loitering notification message or transmit the loitering notification message to a predetermined device when a specific terminal is detected over a specific time in a specific area.

The map display may output a sound corresponding to the loitering notification message.

The map may be a two-dimensional (2D) map or a three-dimensional (3D) map.

The map display may display a control interface providing a user interface to control the at least one wireless network camera displayed on the map display and information received from the at least one wireless network camera.

The control interface may provide the user interface to pan, tilt, and zoom the at least one wireless network camera.

The position information of the terminal may be acquired by using a real time locating service (RTLS).

The map display may display information collected by a specific wireless network camera from among information collected by the at least one wireless network camera, in response to a user input selecting the specific wireless network camera is received through the control interface.

The map display may simultaneously display an image captured by the at least one wireless network camera with the control interface.

The security management device may further include one of the at least one a wireless network camera.

The one of the at least of the wireless network camera may be compliant with an open network video interface forum (ONVIF) standard.

According to an exemplary embodiment of the inventive concept, there is provided a method of tracking a position of a terminal located indoors, the method including: storing position information of at least one wireless network camera installed indoors; collecting information about a terminal located in a range capable of wireless communication with the at least one wireless network camera through the wireless communication; controlling the at least one wireless network camera to track a position of the terminal based on the information about the terminal; displaying on a map a location of the terminal and information about the terminal; and displaying on the map the collected the identification information and position information of the terminal and position tracking information of the terminal, which is performed by the map display, wherein the controlling includes controlling a wireless network camera to track a position of the terminal based on the information about the terminal while the terminal is in a range capable of wireless communication with the wireless network camera, and controlling the first wireless network camera to send identification information of the terminal to a neighboring wireless network camera when the terminal moves out of the range capable of wireless communication with the wireless network camera.

The displaying of a position of the terminal and information about the terminal may include displaying the position or the movement path of the terminal based on the identification information of the terminal.

The method may further include displaying a loitering notification message or transmitting the loitering notification message to a predetermined device, when a specific terminal is detected over a specific time in a specific area.

The method may further include displaying a control interface providing a user interface to select a specific wireless network camera from among the at least one wireless network camera such that information collected by the specific camera is displayed from among information collected by the at least one wireless camera.

According to the indoor position recognition-based security management device according to an exemplary embodiment, it may be determined that an object A photographed by a camera while passing through an entrance at 10 AM is the same object as an object photographed by the camera while passing through the entrance at 6 PM.

Also, the indoor position recognition-based security management device may control access to a restricted area or approval of access to a dangerous area by using map information, and accuracy of security may be improved by providing image information.

Furthermore, information collected from a network camera, e.g., information about new device objects or missing device objects and information about moving objects, may be integrated in one system and thus all movement paths of the respective objects are identified or a specific object may be tracked interlocked with a surveillance device using the integrated system.

BRIEF DESCRIPTION OF THE DRAWINGS

FIG. 7 illustrates a method of displaying position information according to an exemplary embodiment.

DETAILED DESCRIPTION OF THE EXEMPLARY EMBODIMENTS

Hereinafter, exemplary embodiments of the inventive concept will be described in detail with reference to the accompanying drawings.

Figure 1:
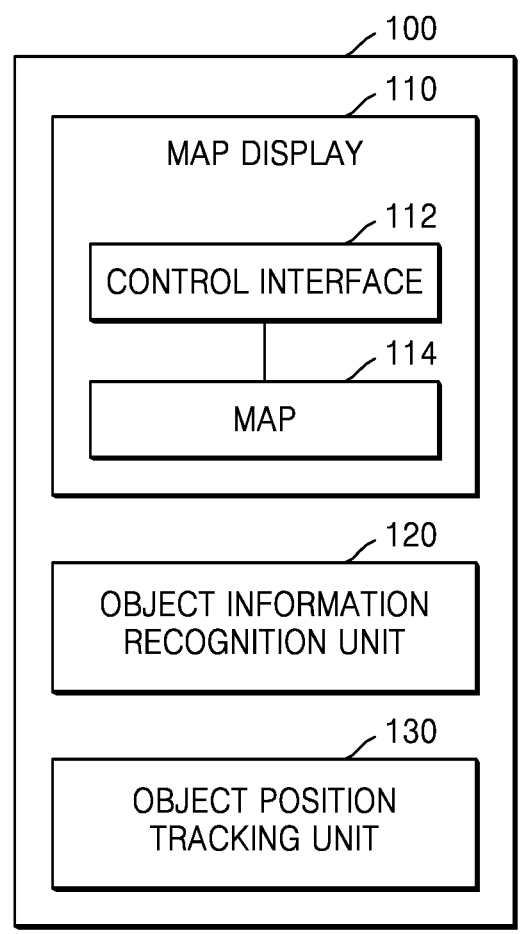
FIG. 1 is a block diagram of an internal configuration of an indoor position recognition-based security management device according to an exemplary embodiment.

FIG. 1 is a block diagram of an internal configuration of an indoor position recognition-based security management device 100 according to an exemplary embodiment.

The indoor position recognition-based security management device 100 may recognize an object moving inside or outside a building by using a wireless network camera installed inside or outside the building. Based on the recognition of objects, the indoor position recognition-based security management device 100 may limit access to a specific area, count the number of people, respond to a fire or an emergency situation, or warn of loitering. An example of the wireless network camera may include, but is not limited to, an internet protocol (IP) Camera.

In an exemplary embodiment, the position of a terminal used by a user may be recognized through wireless communication between the terminal and a wireless network camera installed inside or outside a building. In this case, the terminal may perform wireless communication with the wireless network camera by a wireless communication method, such as a ubiquitous sensor network (USN), WiFi, or Bluetooth.

The wireless network camera inside or outside the building may collect the position of the terminal used by the user by using a method of displaying position information that is one of IP camera functions provided by the open network video interface forum (ONVIF) as illustrated in FIG. 7. Furthermore, according to an exemplary embodiment, the wireless network camera may acquire the position information of a terminal by using a real time locating service (RTLS).

In an exemplary embodiment, the wireless network camera may function as a WiFi Access Point, a Bluetooth Paring Device, and/or a Sync Node that collects USN information.

The indoor position recognition-based security management device 100 may include a map display 110, an object information recognition unit 120, and an object position tracking unit 130. The indoor position recognition-based security management device 100 may include the map display 110 and at least one processor to implement the object information recognition unit 120 and the object position tracking unit 130. For example, such units may be implemented as hardware modules. Alternatively, such units may be implemented as a computer program, and at least one processor may perform the functions of the units by executing instructions of the computer program.

The map display 110 displays a two-dimensional (2D) or three-dimensional (3D) map 114 on a display. The 2D or 3D map 114 may use data previously stored as a database. The map display 110 may be implemented in a terminal used by a manager (e.g., a user of the indoor position recognition-based security management device 100), a terminal capable of wirelessly communicating with the wireless network camera, or the wireless network camera itself.

The map display 110 may display the position information of at least one wireless network camera installed indoors on the 2D or 3D map 114, and additionally display information received from the at least one wireless network camera in an area where the at least one wireless network camera is located or in an adjacent area.

The object information recognition unit 120 may collect identification information and position information of a terminal located within a range capable of wireless communication from each of the at least one wireless network camera, and transmit the collected information to the map display 110. The object information recognition unit 120 may be implemented in the wireless network camera or in a separate apparatus capable of wired/wireless communication with the wireless network camera.

Figure 2:
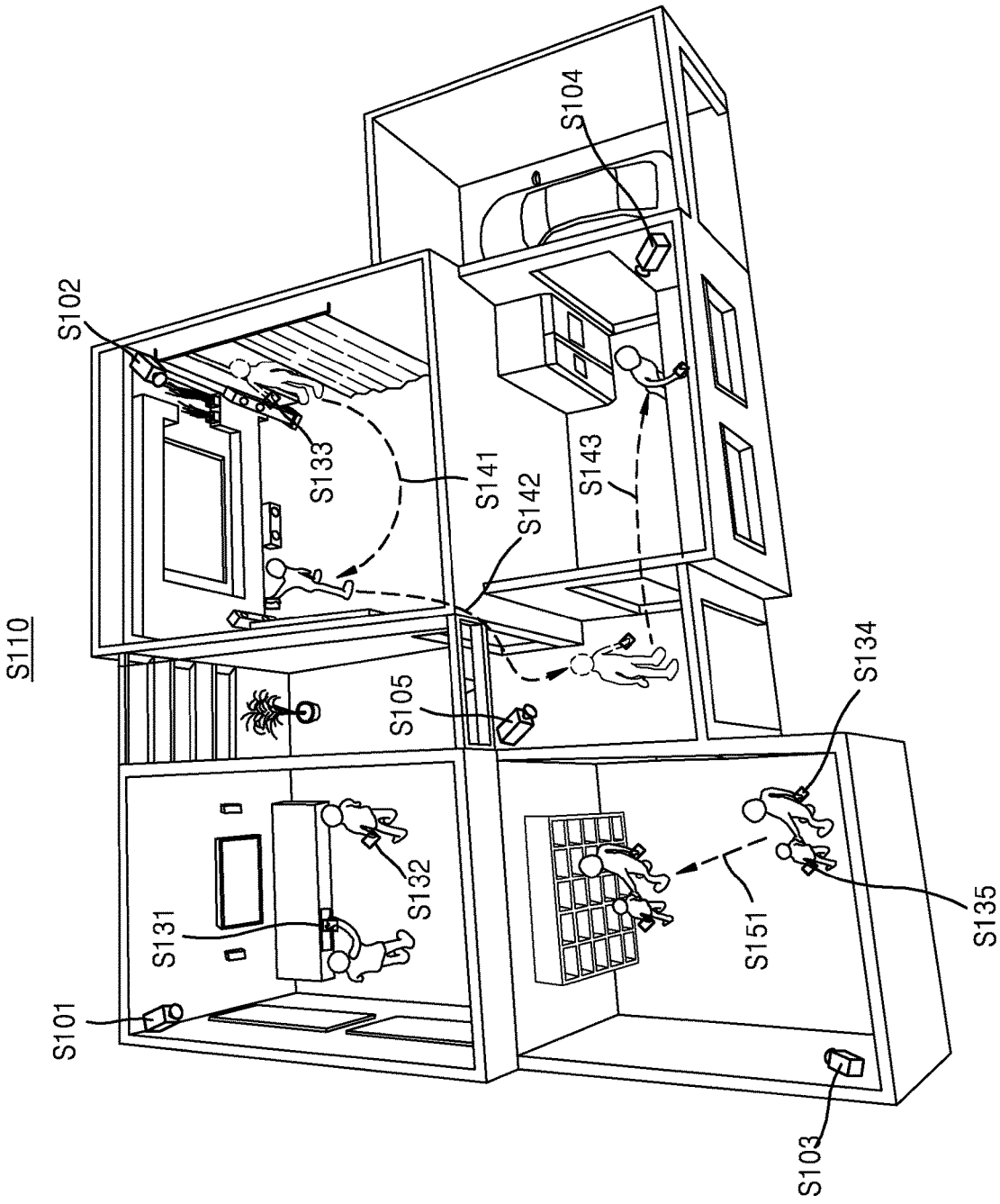
FIG. 2 illustrates three-dimensional maps provided by an indoor position recognition-based security management device according to an exemplary embodiment.

For example, referring to FIG. 2, an IP Camera1 S101, an IP Camera2 S102, an IP Camera3 S103, an IP Camera4 S104, and an IP Camera5 S105 are installed on the 10$^{th}$ floor S110 inside a building.

Two terminals S131 and S132 are detected in a range capable of wireless communication with the IP Camera1 S101, one terminal S133 is detected in a range capable of wireless communication with the IP Camera2 S102, two terminals S134 and S135 are detected in a range capable of wireless communication with the IP Camera3 S103, and the terminal S133 is also detected in a range capable of wireless communication with the IP Camera4 S104 and the IP Camera5 S105. In this case, each wireless network camera detects a terminal in a range capable of wireless communication with respect to unique identification information of a terminal. An example of the unique identification information of a terminal may include, but is not limited to, a MAC address.

For example, the IP Camera2 S102, the IP Camera5 S105, and the IP Camera4 S104 may detect the same terminal S133 at different time slots. In detail, it may be recognized that a user carrying a specific terminal, for example, the terminal S133, has moved from an area S141 where the IP Camera2 S102 is installed, to an area S143 where the IP Camera4 S104 is installed via an area S142 where the IP Camera5 S105 is installed (S141, S142, and S143).

In an exemplary embodiment, the IP Camera2 S102, the IP Camera5 S105, and the IP Camera4 S104 may recognize the detected terminals to be the same terminal S133 based on the unique identification information of the terminal S133.

In this case, the map display 110 may count the number of terminals wirelessly communicating with the at least one wireless network camera based on the identification information of a terminal, and display the position and movement path of the terminal based on the identification information of a terminal.

The movement paths S141, S142, and S143 of the user carrying the specific terminal S133 may be tracked using the unique identification information of the terminal S133 and displayed on the map display 110.

Furthermore, images captured by the IP Camera2 S102, the IP Camera5 S105, and the IP Camera4 S104 may be displayed altogether on the map display 110, to detect a change of user when a first user carrying the terminal S133 hands over the terminal S133 to a second user at a specific position. For example, when the user of the terminal S133 is changed from "A" to "B", such change may be identified through the captured images.

Figure 3:
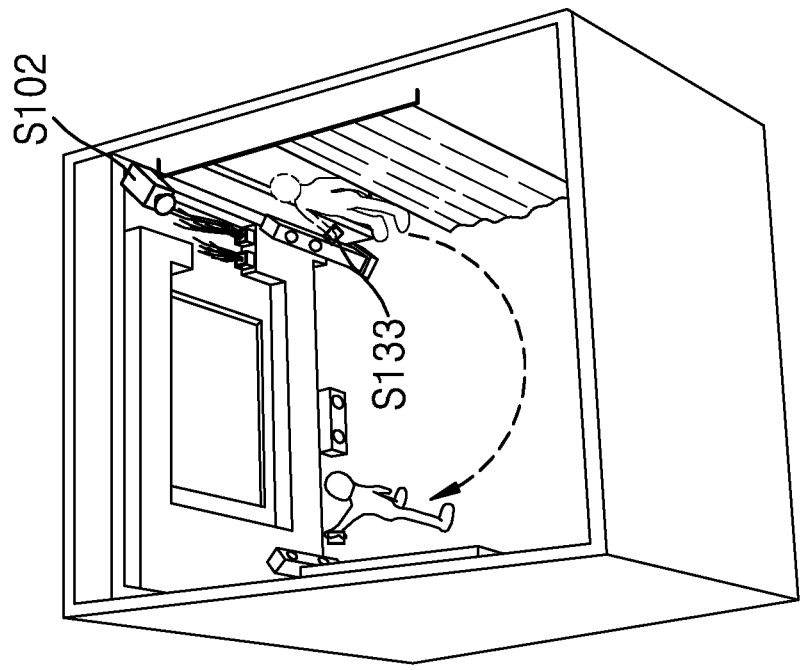
FIG. 3 illustrates a three-dimensional (3D) map provided by an indoor position recognition-based security management device according to an exemplary embodiment.

Referring to FIG. 3, when the user selects a specific wireless network camera, for example, the IP Camera2 S102, from the map display 110 by using a control interface 112, the map display 110 may be configured to display an image received from the IP Camera2 S102 and the terminal S133 detected by the IP Camera2 S102, with a movement path of the detected terminal S133.

Panning, tilting, and zooming (PTZ) of the wireless network camera, for example, the IP Camera2 S102, may be controlled through the control interface 112. The face of the user of the terminal S133 may be enlarged through the control interface 112 to identify the user.

Figure 4:
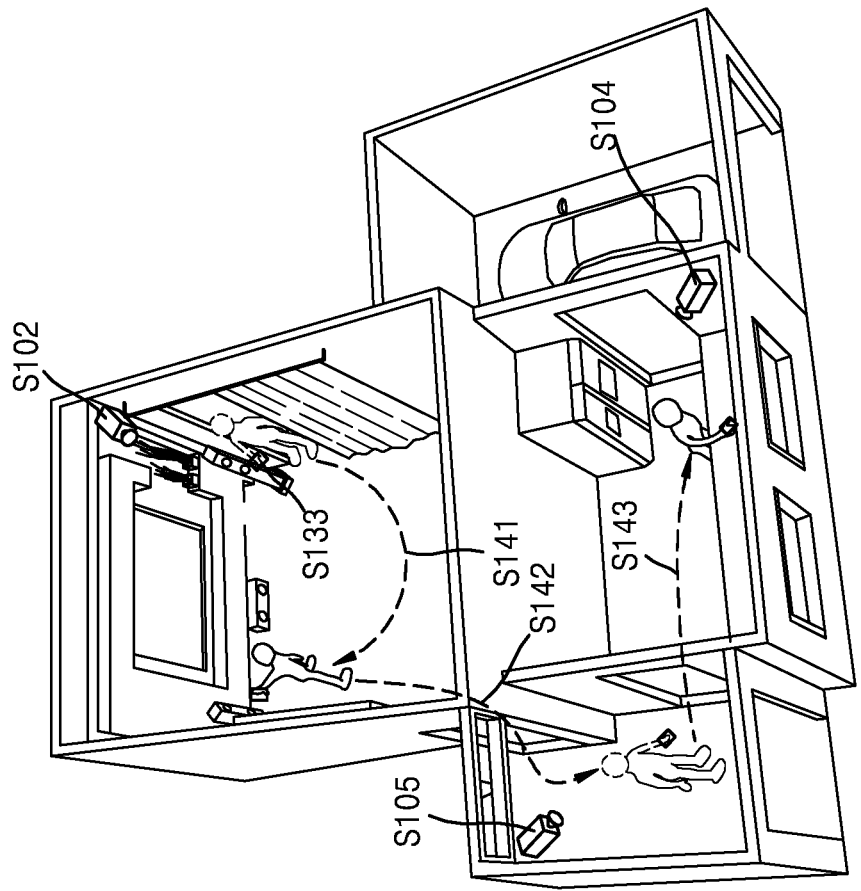
FIG. 4 illustrates a 3D map provided by an indoor position recognition-based security management device according to another exemplary embodiment.

FIG. 4 illustrates an example of tracking an object that moves from a zone A to a zone C via a zone B by providing tracking information of the moving object from a wireless network camera in the zone A to a wireless network camera in the zone B and from the wireless network camera in the zone B to a wireless network camera in the zone C, according to an exemplary embodiment.

The object position tracking unit 130 may be configured to continuously track the position of a terminal. To this end, the object position tracking unit 130 may control each of the wireless network cameras S101, S102, S103, S104, and S105 to track the position of a terminal located in a range capable of wireless communication.

When the terminal being tracked is out of the range capable of wireless communication, identification information of the terminal may be transferred to a neighboring wireless network camera.

Referring to FIG. 4, when a user carrying the terminal S133 moves along the path S141, the IP Camera2 S102 may tracks the position of the user through wireless communication with the terminal S133. When the IP Camera2 S102 loses connection to the terminal S133 as the user of the IP Camera2 S102 moves to the lower left area along the path S142, the IP Camera2 S102 may transmit information, which indicates that the user carrying the terminal S133 with a specific identification number will appear, to the IP Camera5 S105, which is a neighboring wireless network camera of the IP Camera2 S102 in the direction corresponding to the movement path S141. The IP Camera2 S102 may provide such information to the IP Camera5 S105 before the terminal S133 is out of a range for the wireless communication. For example, the IP Camera may send such information to the IP Camera5 S105 when signal strength of signals received from the terminal S133 reaches a predetermined lower threshold level.

Likewise, as the user further moves to the lower right area along the path S143, the IP Camera5 S105, which photographs the user and tracks the position of the terminal S133 by wirelessly communicating with the terminal S133 of the user, may transmit information indicating that the user carrying the terminal S133 with the specific identification number will appear, to the IP Camera4 S104 that is a neighboring wireless network camera of the IP Camera4 S104 in the direction corresponding to the movement path S143.

In another exemplary embodiment, in the case the map display 110 displays the position or movement path of a terminal based on the identification information of the terminal, when wireless communication between the terminal and a wireless network camera is cut off, the map display 110 may be configured to display the wireless network camera that performed wireless communication with the terminal immediately before the wireless communication is cut off, with an image captured by a neighboring wireless network camera. Accordingly, even when wireless communication is temporarily cut off, movement of an object in another area may be continuously monitored.

Figure 5:
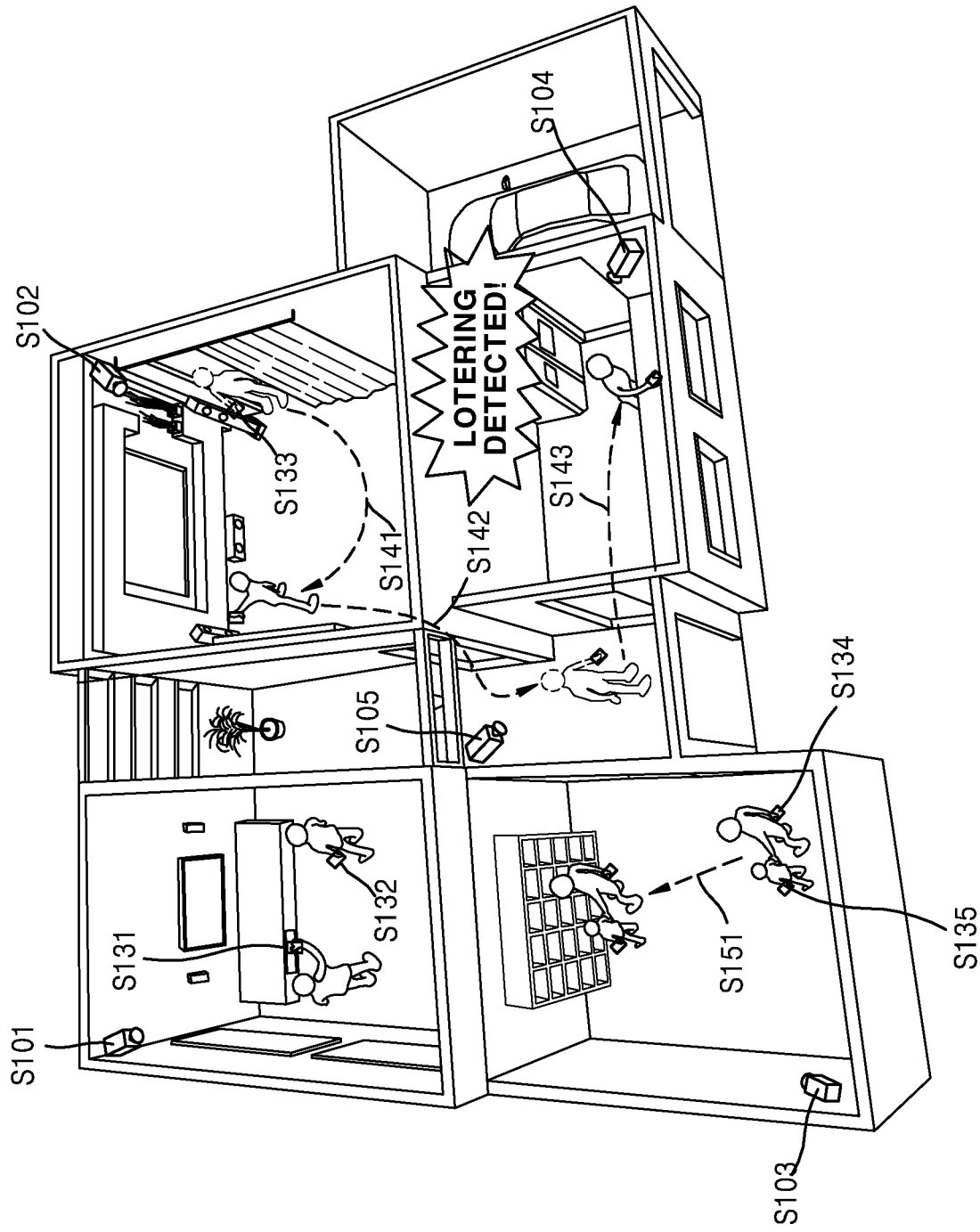
FIG. 5 illustrates a 3D map provided by an indoor position recognition-based security management device according to yet another exemplary embodiment.

FIG. 5 illustrates an example of a screen of indoor position recognition-based security management device displaying a loitering notification message, according to an exemplary embodiment.

The indoor position recognition-based security management device 100 may include a loitering detection function by displaying a loitering notification message on the map display 110 of FIG. 1 or transmitting a loitering notification message to the manager when a specific terminal is detected in a specific area over a specific time.

In an exemplary embodiment, when the IP Camera4 S104 detects a person loitering for over 20 minutes in the room next to a garage where a vehicle is located, a loitering notification message may be displayed on the map display 110 of FIG. 1 or output in the form of sound or vibration. The loitering notification message may be transmitted to the manager's terminal.

After checking the loitering notification message, the manager may perform security management by using image information received from the wireless network camera and displayed on the map display 110.

Figure 6:
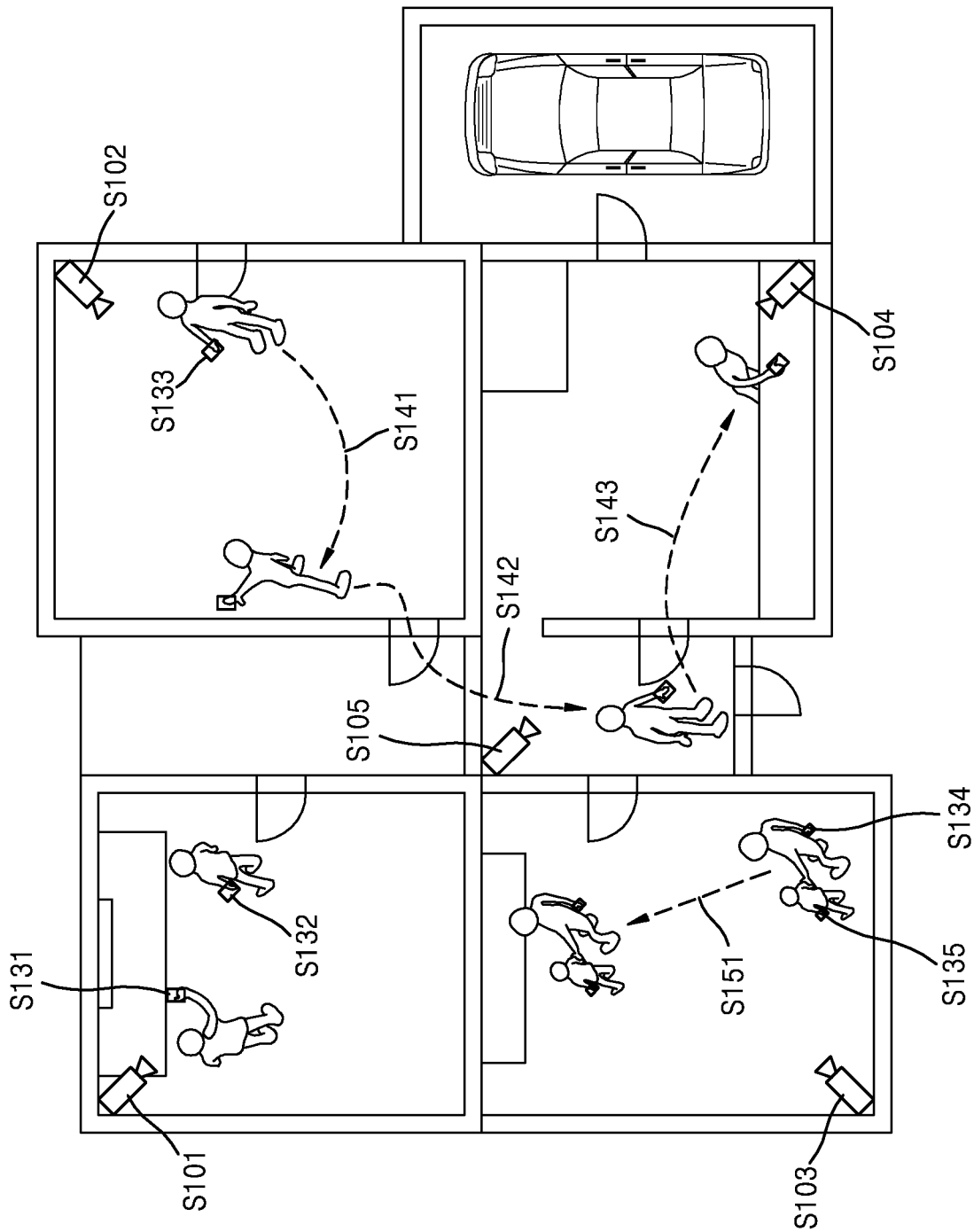
FIG. 6 illustrates a two-dimensional (2D) map provided by an indoor position recognition-based security management device according to an exemplary embodiment.

FIG. 6 illustrates an example of a 2D map provided by the indoor position recognition-based security management device 100 according to an exemplary embodiment. As shown in FIG. 6, the 2D map may display images captured by the wireless network cameras S101 to S104 and movement paths S141-S143 and S151 of users respectively carrying the terminals S131 to S135.

FIG. 7 illustrates a method of displaying position information, which is one of the functions of an IP camera provided by the ONVIF standard, according to an exemplary embodiment.

Figure 8:
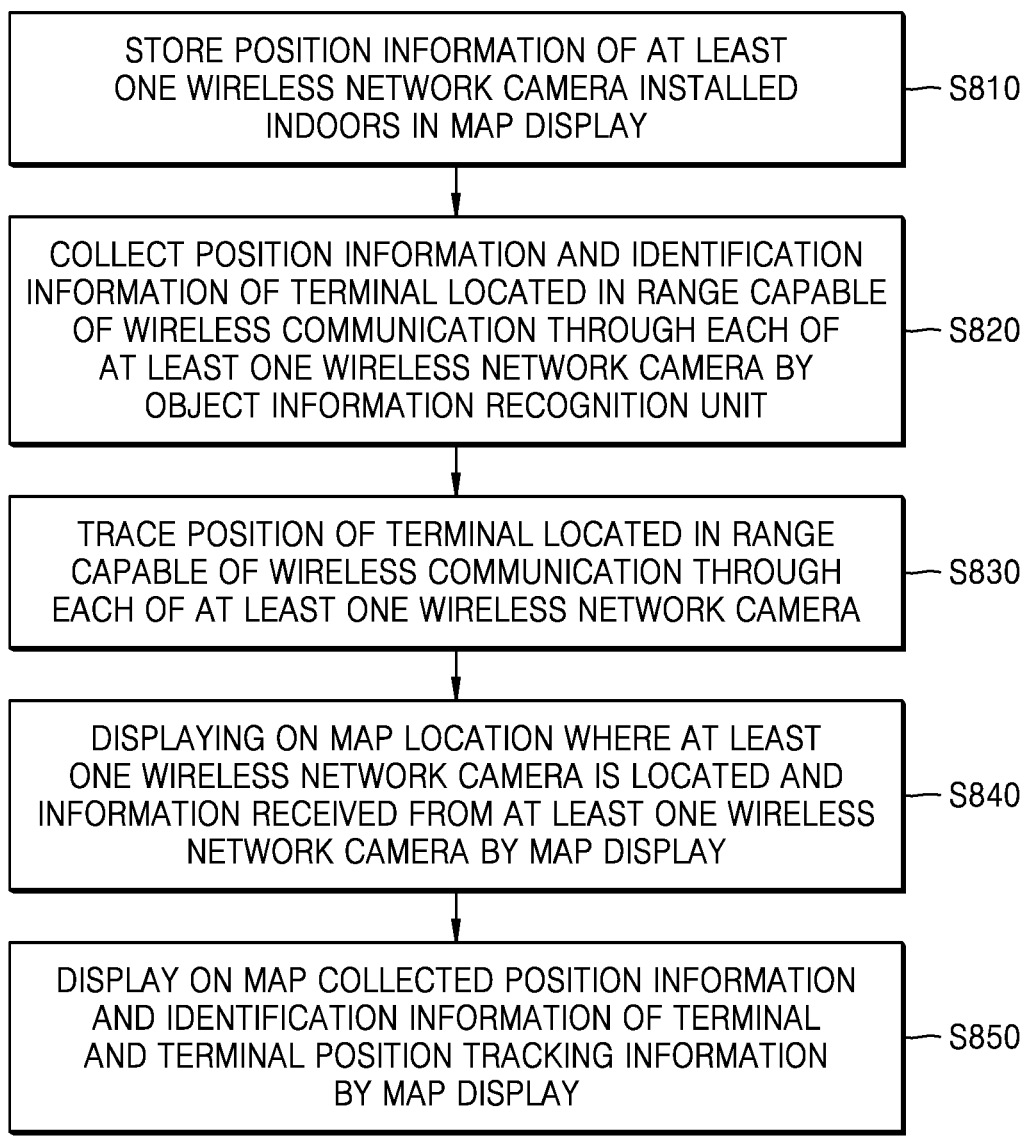
FIG. 8 is a flowchart of a method of performing security management by the indoor position recognition-based security management device according to an exemplary embodiment.

FIG. 8 is a flowchart of a method of performing security management by tracking the position of an object by the indoor position recognition-based security management device 100, according to an exemplary embodiment.

The map display 110 of the indoor position recognition-based security management device 100 stores position information of at least one wireless network camera installed indoors (S810).

The object information recognition unit 120 collects identification information of a terminal and position information located in a range capable of wireless communication through each of the at least one wireless network camera (S820).

Each of the at least one wireless network camera tracks the position of a terminal located in the respective range capable of wireless communication. When the terminal being tracked moves out of the range capable of wireless communication, each of the at least one wireless network camera transmits identification information of the terminal being tracked, to a neighboring wireless network camera so that the position of the terminal may be continuously tracked (S830).

The map display 110 displays on a 2D and/or 3D map at least one of a location where the at least one wireless network camera is located, information about captured images received from the at least one wireless network camera, information about the terminal detected by at least one wireless network camera (e.g., position information and identification information of the terminal), and terminal position tracking information (e.g., information about a terminal movement path tracked by the at least one wireless network camera) (S840 and S850).

The indoor position recognition-based security management device according to the exemplary embodiments can be written as computer programs and can be implemented in general-use digital computers that execute the programs using a computer-readable recording medium. The computer-readable recording medium may include a program command, a data file, and a data structure solely or by combining the same. The computer program may be specially designed and configured for the present inventive concept or may be well known to one skilled in the art of computer software, to be usable.

Examples of the computer-readable recording medium include magnetic media, e.g., hard disks, floppy disks, and magnetic tapes, optical media, e.g., compact disc read only memories (CD-ROMs) and digital versatile disks (DVDs), magneto-optical media, e.g., floptical disks, and hardware devices configured to store and execute program commands, for example, programming modules, e.g., read only memories (ROMs), random access memories (RAMs), flash memories.

Furthermore, the program command may include not only machine code created by a compiler but also high-level language code executable by a computer using an interpreter. The above-described hardware apparatuses may be configured to operate as one or more software modules to perform operations according to various embodiments of the present inventive concept, or vice versa.

The one or more exemplary embodiments described above are intended to exemplify the present inventive concept, and do not limit the present inventive concept. It will be understood by one of ordinary skill in the art that various substitutions, amendments, or modifications may be made to the one or more embodiments of the present inventive concept without departing from the spirit and scope of the present inventive concept.

What is claimed is:

1. A Security management device comprising:
a map display configured to store information about a position of at least one wireless network camera installed indoors, and display on a map a position of the at least one wireless network camera and information about a terminal located in a range capable of wireless communication with the at least one wireless network camera; and
at least one processor to implement:
an object information recognizer configured to receive information about a terminal from the at least one wireless network camera, the information about the terminal being collected by the at least one wireless network camera through the wireless communication; and
an object position tracker configured to control a wireless network camera to track a position of the terminal based on the information about the terminal while the terminal is in a range capable of wireless communication with the wireless network camera, and control the wireless network camera to send identification information of the terminal to a neighboring wireless network camera when the terminal moves out of the range capable of wireless communication with the wireless network camera.

2. The security management device of claim 1, wherein the information about the terminal comprises an image captured by the at least one wireless network camera, the identification information of the terminal, and position information of the terminal.

3. The security management device of claim 1, wherein the map display is configured to display a position or a movement path of the terminal based on the identification information of the terminal.

4. The security management device of claim 3, wherein the map display is further configured to simultaneously display an image captured by the at least one wireless network camera with the position of the terminal or the movement path of the terminal.

5. The security management device of claim 3, wherein the map display is further configured to, if wireless communication between the terminal and the wireless network camera is cut off while displaying the position or the movement path of the terminal, display the wireless network camera with an image captured by the neighboring wireless network camera.

6. The security management device of claim 1, wherein each of the at least one wireless network camera has an access point (AP) function and the position information of the terminal located in a range capable of wireless communication is collected by using the AP function.

7. The security management device of claim 1, wherein the map display is further configured to display a loitering notification message or transmit the loitering notification message to a predetermined device when a specific terminal is detected over a specific time in a specific area.

8. The security management device of claim 7, wherein the map display is further configured to output a sound corresponding to the loitering notification message.

9. The security management device of claim 1, wherein the map display is further configured to display a control interface providing a user interface to control the at least one wireless network camera displayed on the map display and information received from the at least one wireless network camera.

10. The security management device of claim 9, wherein the control interface provides the user interface to pan, tilt, and zoom the at least one wireless network camera.

11. The security management device of claim 2, wherein the position information of the terminal is acquired by using a real time locating service (RTLS).

12. The security management device of claim 9, wherein the map display is further configured to display information collected by a specific wireless network camera from among information collected by the at least one wireless network camera, in response to a user input selecting the specific wireless network camera through the control interface.

13. The security management device of claim 9, wherein the map display is further configured to simultaneously display an image captured by the at least one wireless network camera with the control interface.

14. The security management device of claim 1, further comprising the at least one wireless network camera.

15. The security management device of claim 14, wherein the at least one wireless network camera is compliant with an open network video interface forum (ONVIF) standard.

16. A method of tracking a position of a terminal located indoors, the method comprising:
storing position information of at least one wireless network camera installed indoors;
collecting information about a terminal located in a range capable of wireless communication with the at least one wireless network camera through the wireless communication;
controlling the at least one wireless network camera to track a position of the terminal based on the information about the terminal;
displaying on a map a location of the terminal and information about the terminal; and
displaying on the map the collected identification information and position information of the terminal and position tracking information of the terminal, which is performed by the map display,
wherein the controlling comprises
controlling a wireless network camera to track a position of the terminal based on the information about the terminal while the terminal is in a range capable of wireless communication with the wireless network camera, and
controlling the first wireless network camera to send identification information of the terminal to a neighboring wireless network camera when the terminal moves out of the range capable of wireless communication with the wireless network camera.

17. The method of claim 16, wherein the displaying of a position of the terminal and information about the terminal comprises displaying the position or the movement path of the terminal based on the identification information of the terminal.

18. The method of claim 16, further comprising displaying a loitering notification message or transmitting the loitering notification message to a predetermined device, when a specific terminal is detected over a specific time in a specific area.

19. The method of claim 16, further comprising displaying a control interface providing a user interface to select a specific wireless network camera from among the at least one wireless network camera such that information collected by the specific camera is displayed from among information collected by the at least one wireless camera.

20. A Security management device comprising:
a map display configured to store information about a position of at least one wireless network camera installed indoors;
the map display configured to display on a map a position of the at least one wireless network camera as well as a movement path about a terminal located in a range capable of wireless communication with the at least one wireless network camera;
at least one processor including:
an object information recognizer receiving information about a terminal from the at least one wireless network camera, the information about the terminal being collected by the at least one wireless network camera through the wireless communication; and
an object position tracker controlling at least one wireless network camera to track a position of the terminal based on the information about the terminal while the terminal is in a range capable of wireless communication with the at least one wireless network camera, and control the at least one wireless network camera to send identification information of the terminal to a neighboring wireless network camera when the terminal moves out of the range capable of wireless communication with the at least one wireless network camera; and
the map display configured to simultaneously display an image captured by the at least one wireless network camera with the movement path of the terminal.

* * * * *